United States Patent [19]

McCaffery

[11] Patent Number: 5,264,303
[45] Date of Patent: Nov. 23, 1993

[54] BATTERY HOUSING AND CAP

[75] Inventor: Timothy J. McCaffery, Springfield, Va.

[73] Assignee: The United States of America as represented by the Secretary of the Army, Washington, D.C.

[21] Appl. No.: 891,260

[22] Filed: Jun. 1, 1992

[51] Int. Cl.⁵ .............................................. H01M 2/10
[52] U.S. Cl. ..................................... 429/99; 429/100; 429/186; 429/9
[58] Field of Search ....................... 429/9, 96, 99, 186, 429/100, 178

[56] References Cited

U.S. PATENT DOCUMENTS

| | | | |
|---|---|---|---|
| 3,178,317 | 4/1965 | Maddaloni | 429/99 |
| 4,644,244 | 2/1987 | Kittelson | 429/96 X |
| 4,724,189 | 2/1988 | Chase | 429/99 |
| 4,806,440 | 2/1989 | Hahs, Jr. et al. | 429/99 X |

Primary Examiner—John S. Maples
Attorney, Agent, or Firm—Milton W. Lee; Alain L. Bashore

[57] ABSTRACT

A battery holder with a housing with common terminals on a closed end and wing elements on an open end to releasably connect a cap to the housing. A support element and electrical connecting elements allow for the adaptive support of different sized batteries.

1 Claim, 3 Drawing Sheets

BATTERY HOUSING AND CAP

BACKGROUND OF THE INVENTION

1. Field of the Invention

The field of the invention disclosed herein is directed to battery holders and more specifically to battery holders for use with different sized batteries.

2. Description of Related Prior Art

Batteries require a method for holding and for providing electrical connections which must be reliable. Many forms of battery holders are known in the prior art with a continual need for a better design. The problems of holder design is made more difficult by the varied uses and many different types of batteries on the market, with some having different types of anodes and cathodes such as seen with respect to lithium-type batteries versus typical dry-cell batteries.

There is a need in the prior art to provide a simple easy to use holder which may be used for different sized batteries having dissimilar anodes and cathodes.

SUMMARY OF THE INVENTION

The invention disclosed herein is directed to a battery holder including a housing with open and closed ends and a support means inside the housing for holding a short battery and aligning a longer one. When a short sized battery is used, the battery sits on a support element where electrical contact is made through springs for the cathode and springs in the cap for the anode. For a longer sized battery, the batteries are positioned through holes in the support element to sit on the bottom of the closed end so that electrical contact is made through a spring at the closed end for the anode and again with the cap in place, through springs for the cathode.

The primary objective of this invention is to provide a simple easy to use battery holder that may be used for different sized batteries having dissimilar anode and cathode types.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
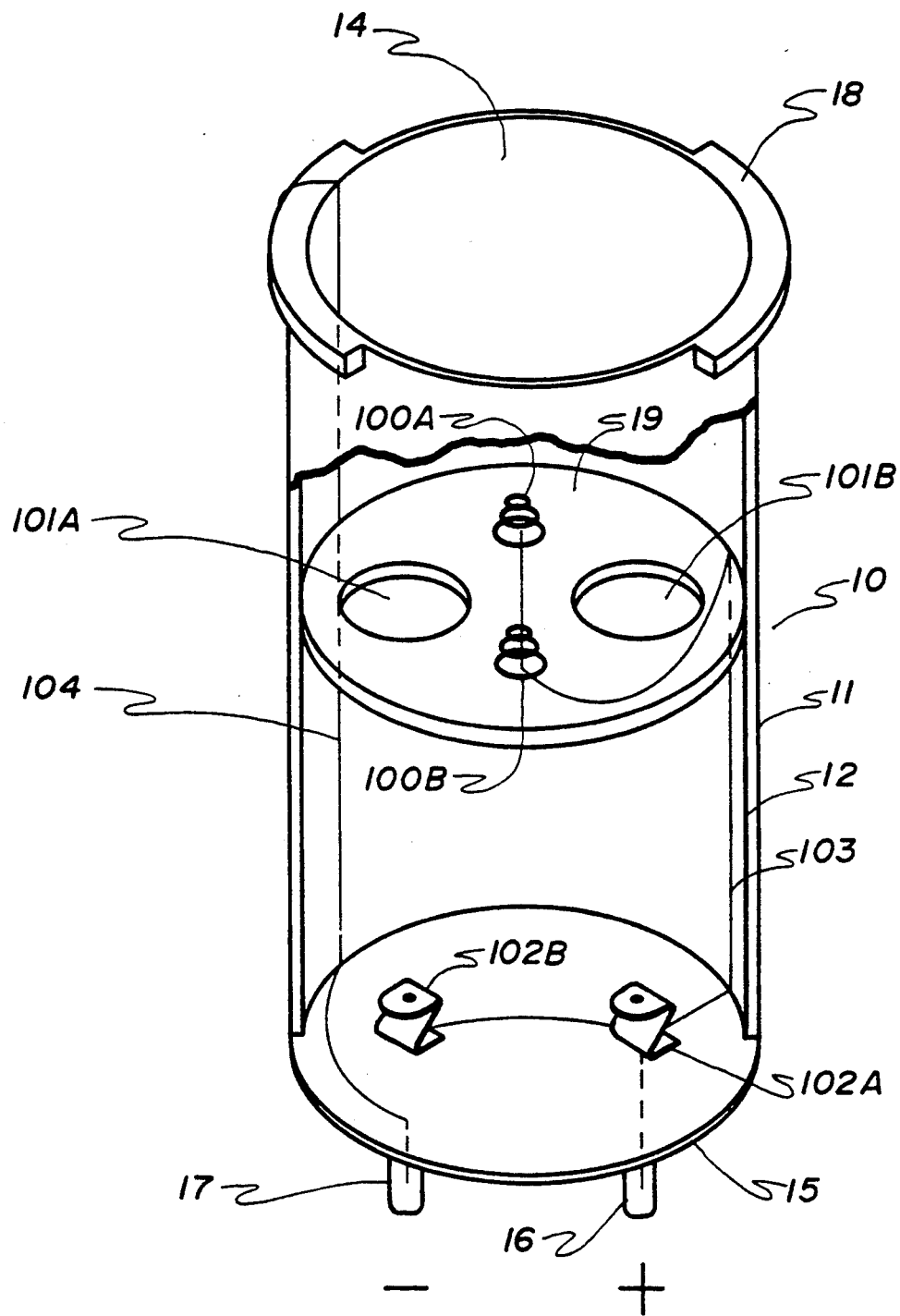
FIG. 1 is an isometric view of the present invention with cutaway not including the cap.

The preferred embodiment will now be discussed with reference to the drawing figures. FIG. 1 shows an isometric view of the battery holder of the present invention. Holder 10 includes outer wall 11 and inner wall 12 with open end 14 is designed to accept differently sized batteries. Closed end 15 includes common terminals 16 and 17 which project perpendicularly outward from outside surface of closed end 15 and act as cathode and anode respectively. Wing elements 18 project radially outward from outer wall 11 at open end 14 which function as releasable connecting means and as an electrical coupling to the cap shown in FIGS. 3 and 4.

Figure 2:
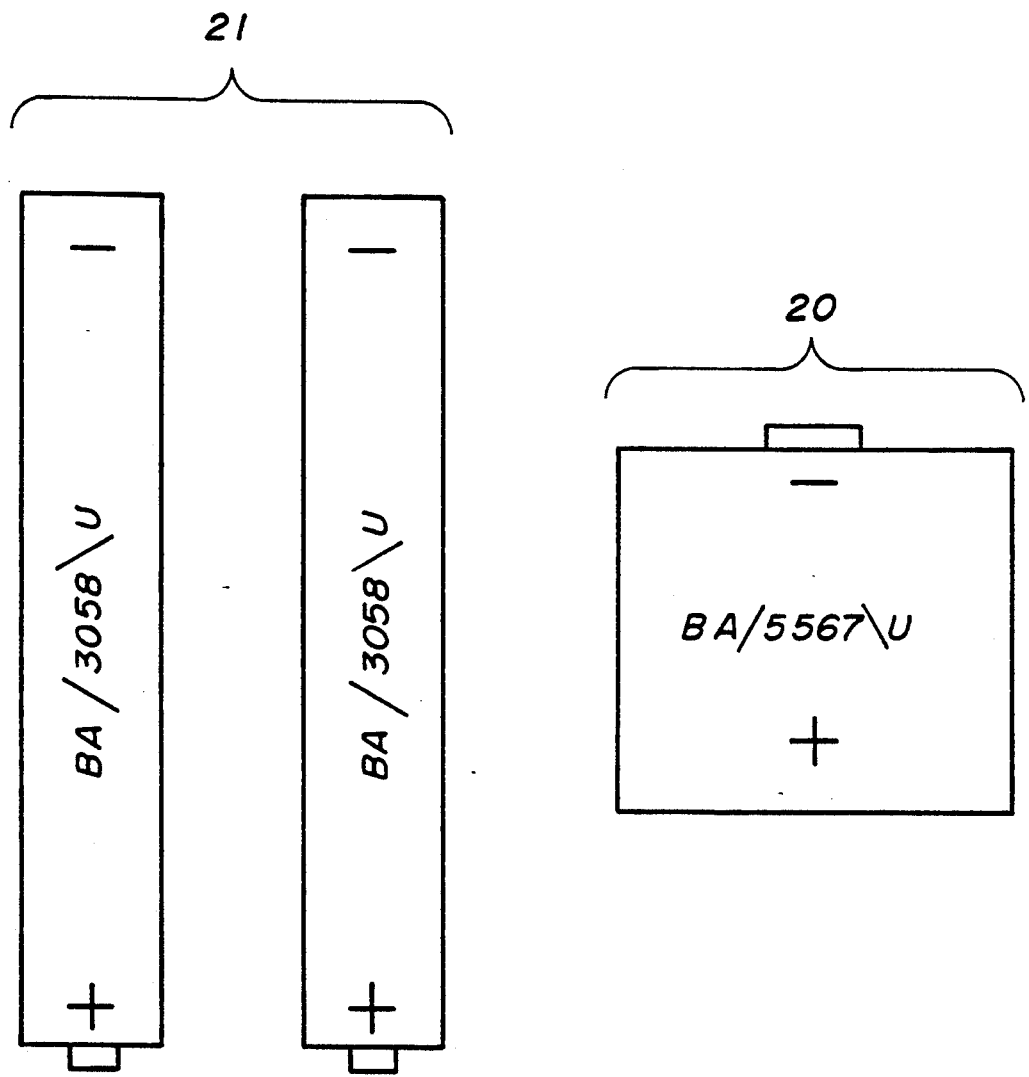
FIG. 2 is a front view of two types of batteries that may be used in the present invention.

FIG. 2 shows two typical types of batteries which may be used in the present invention. Element 20 is a lithium battery usable in the preferred embodiment with a specific type shown designated as model No. BA/556-7/U. Element 21 is a pair of typical "AA" size batteries as another type for use in the preferred embodiment, with specific types shown as model No. BA/3058/U. A support means allows the use of either type of battery to be used.

Support shelf 19 is the support means which is perpendicular to open end 14 and closed end 15 as shown in FIG. 1 which adaptively supports a short length battery, such as shown in FIG. 2 as element 20. Spring contacts 100a and 100b of FIG. 1 function as cathode battery connectors for a short battery where two spring contacts 100a and 100b provide optimum support. Holes 101a and 101b in shelf 19 allows a longer sized dry cell battery such as shown in FIG. 2, as element 21 to be positioned concentrically along the entire length of holder 10 of FIG. 1. Springs 102a and 102b function as anode battery connector for the longer sized battery. Wire 103 serves as an electrical interconnecting means to connect elements 100a, 100b, 102a, and 102b to common terminal 16. Wire 103 is positioned along inner wall 12 of container 10.

Figure 4:
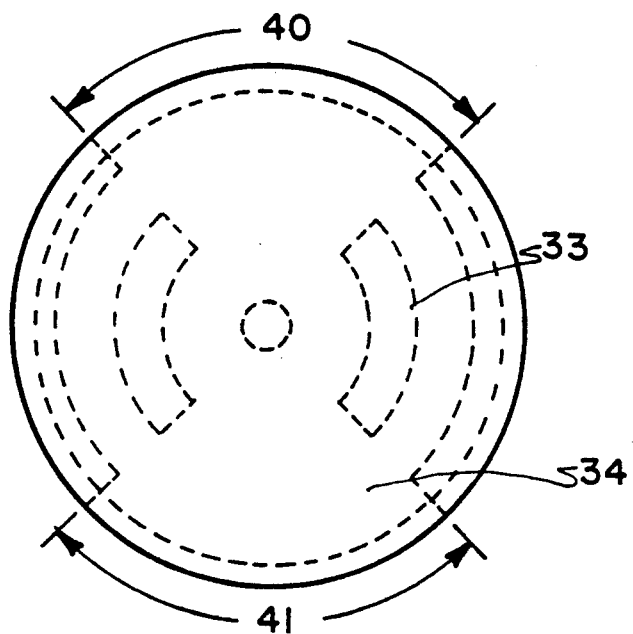
FIG. 4 is a top view of the cap.
Figure 3:
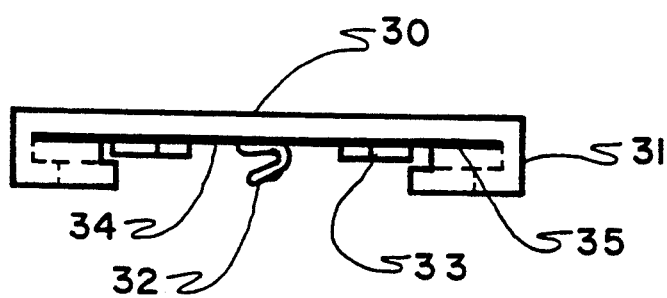
FIG. 3 is a side view of the cap.

FIGS. 3 and 4 show a side and top view respectively of the cap of the present invention. Cap 30 of FIG. 3, with side tabs 31, includes a spring 32 as an anode battery connector for a shorter length battery such as a lithium battery and connector 33 as anode battery connector for longer length batteries such as a pair of typical "AA" size batteries. A connector plate 34 electrically connects the anode battery connectors to an inside end 35 of cap 15 30 to contact with wing elements 18 of FIG. 1 and through wire 104 to terminal 17 when cap 30 of FIG. 3 is releasably attached to holder 10 of FIG. 1. As seen in FIG. 4 the side tabs of cap 30 in FIG. 3 are not entirely contiguous sides but are composed of two semi-circular halfs with spaces 40 and 41 inbetween to allow for insertion over wing elements 18 of FIG. 1 whereupon cap 30, of FIG. 3, may be pushed and twisted to releasably connect same to the open end 14 of FIG. 1.

While specific types and number of batteries have been disclosed in the preferred embodiment it is understood that the invention is not limited to such. Different sized batteries may be used depending on the longitudinal placement of support member 19 of FIG. 1 and by increasing the number of battery contacts and changing the overall shape of holder 10, multiple batteries may be utilized. The present holder has significant advantages over the prior art devices in that both lithium and regular dry-cell batteries may be inserted with the same polarity orientation with ease.

Industrial applicability of this invention includes but is not limited to: electronics, automotive and optical-vision.

This preferred embodiment is not intended to restrict the invention to the precise embodiment or embodiments described.

I claim:

1. A battery housing for holding and providing common electrical connections for different battery sizes comprising:

a container having closed and open ends perpendicular to a side wall, said closed end and side wall having inside and outside surfaces, and with said container including anode and cathode terminals extending through said closed end;

a cap having top, bottom, and side walls which is releasably and electrically connectable to said container side wall at the top edge of said open end;

a shelf with a top and bottom surface inside said container parallel to said closed end for supporting a battery and having at least two alignment holes therein to alternatively align at least two batteries extending through said alignment holes, wherein said shelf further includes a firs electrical coupling means mounted on said shelf and electrically connected to the cathode terminal of said container for coupling the cathode of the battery supported on said shelf, and, alternatively, the cathode terminals of the batteries extending through the alignment holes of said shelf to the anode terminal extending through the closed end of said container;

a second electrical coupling means on said bottom of said cap which electrically couples said battery supported on said shelf, or said alternative batteries, to an electrically conductive plate on said bottom of said cap;

a third electrical coupling means on a top end of said side wall of said container at said open end, whereby electrical connection is achieved to said anode terminals through said plate when said cap is coupled to said container, thereby effecting an electric circuit from the anode terminal, extending through said bottom of said container, through said third electrical coupling means between the container and cap, thence through said second electrical coupling means to said anode of said battery through said battery and then through said first electrical coupling means to said cathode terminal extending through said bottom of said container.

* * * * *